INVENTOR.
JEFFERY K. BELL
BY
Fishburn, Gold & Litman
ATTORNEYS

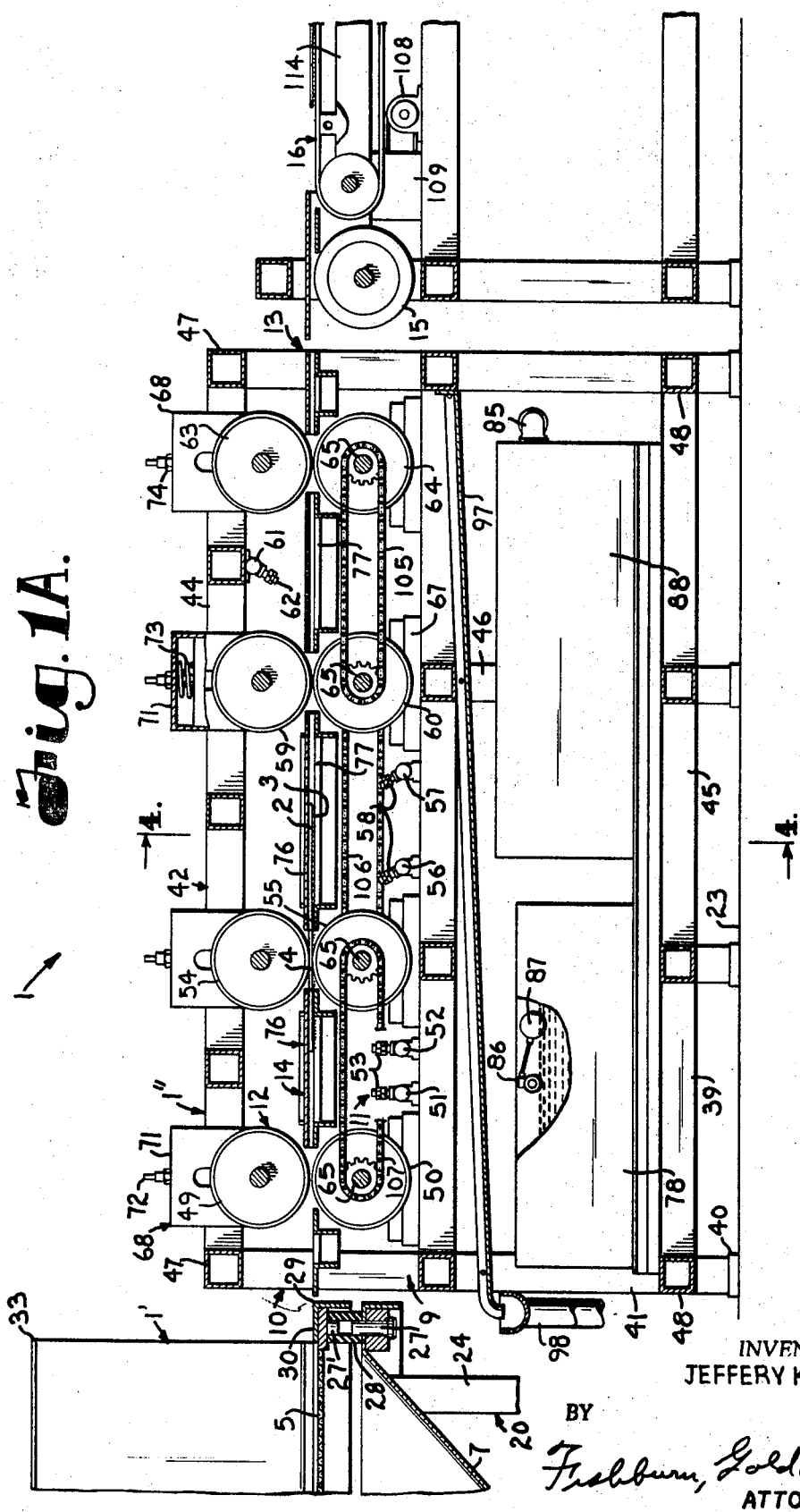

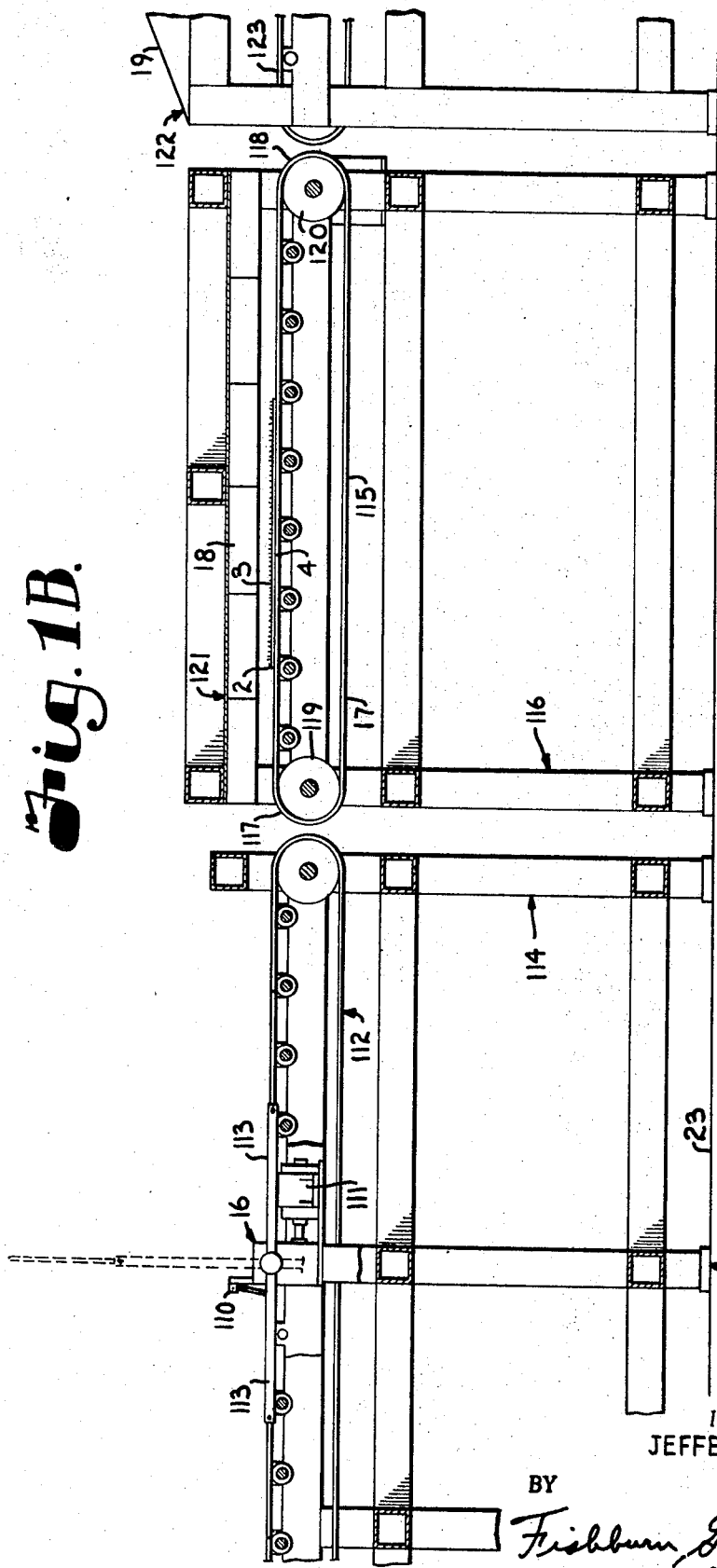

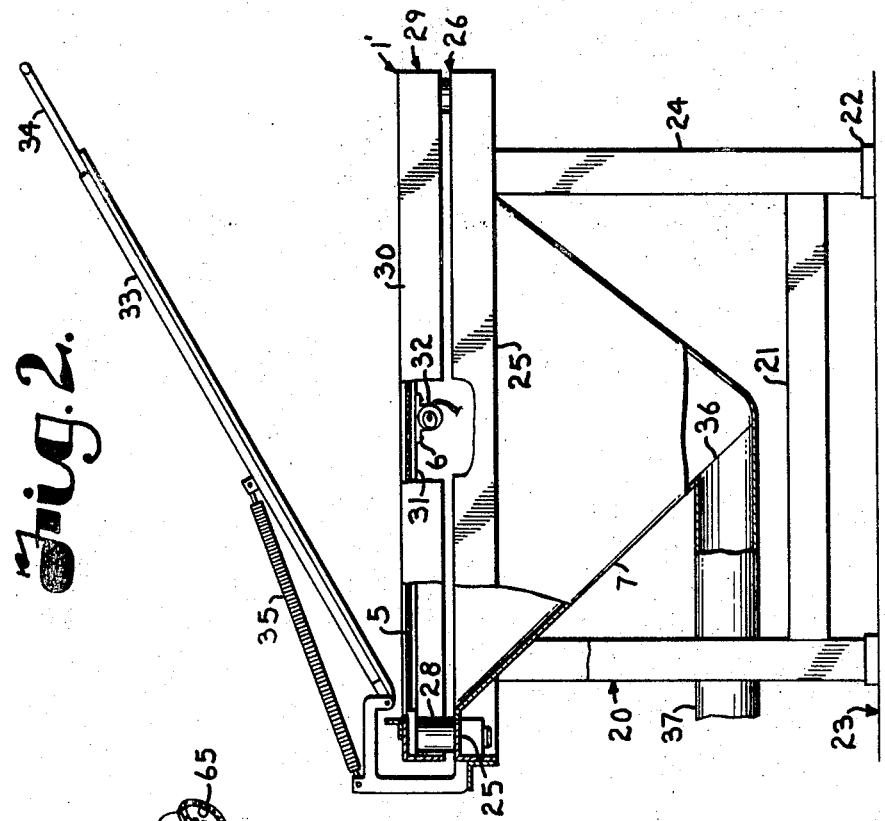
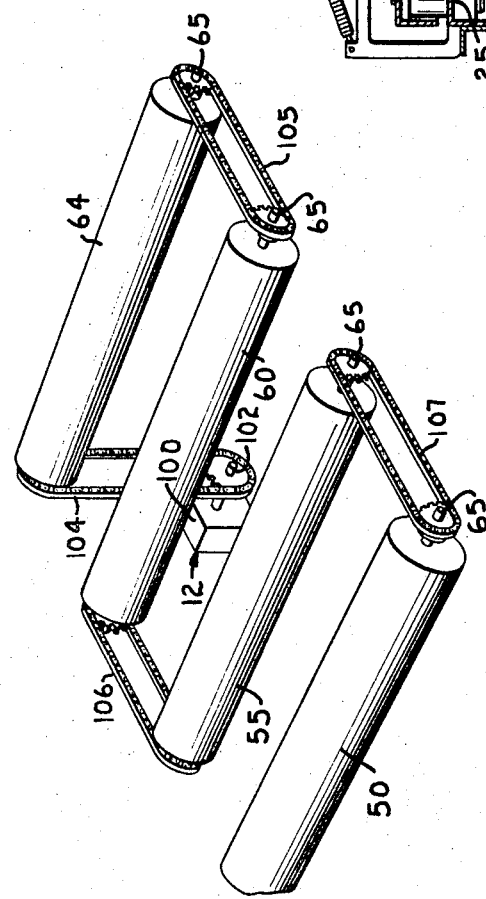

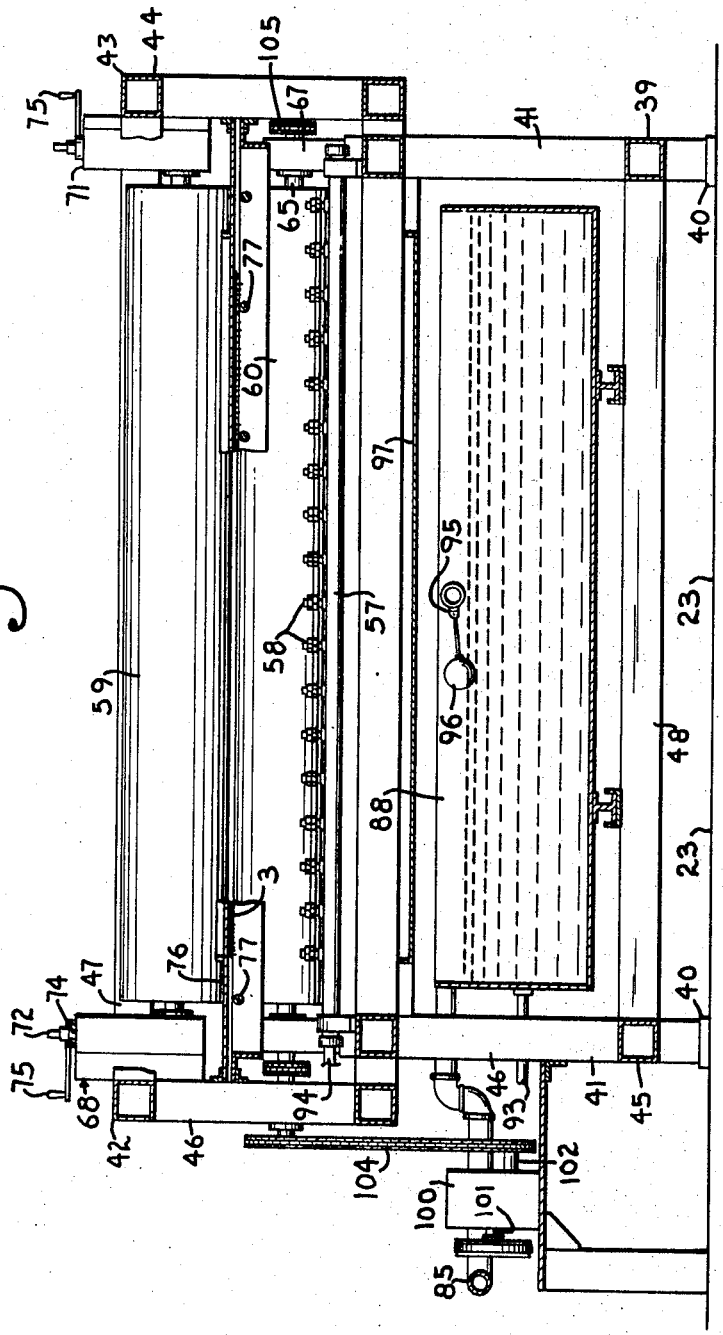

United States Patent Office 3,574,526
Patented Apr. 13, 1971

3,574,526
RUG CLEANING APPARATUS AND METHOD
Jeffrey K. Bell, 7845 Summit, Kansas City, Mo. 64114
Filed Apr. 7, 1969, Ser. No. 814,096
Int. Cl. A47l *11/00;* D06g *1/00*
U.S. Cl. 8—149.1　　　　　　　　　　　　　　13 Claims

ABSTRACT OF THE DISCLOSURE

Rug cleaning apparatus includes a horizontal resiliently mounted screen positioned to receive and support a rug having a nap or pile side engaging the screen and vibrating means associated with the screen for vibrating the screen and rug thereon for removing foreign material therefrom and collecting same in a collection chamber below the screen where vacuum means removes the foreign material. An elongate frame is positioned adjacent the vibrating screen and carries rug moving means positioned thereon to receive the rug and move same along the frame, said rug moving means being in the form of a plurality of rollers arranged in longitudinally spaced and aligned pairs with the rollers in each pair being vertically spaced apart. Path defining means guides the moving rug between the vertically spaced pairs of rollers thereby positioning same above a plurality of longitudinally spaced elongate spray bars each having a plurality of spray nozzles for directing overlapping sprays of cleansing and rinsing fluid against the nap side of the rug. Belt conveying means are positioned to receive the rug from the frame and move same adjacent a plurality of heating elements for drying the rug and the belt conveying means moves the heated and dried rug adjacent fan means for cooling same.

---

The present invention relates to apparatus and method for cleaning rugs and more particularly to apparatus and method for vibrating a rug with a nap side down, moving same along a defined path, spraying cleansing fluid and then rinsing fluid onto the nap side, moving same along a belt conveyor adjacent a plurality of heating elements and then adjacent fan means for drying and cooling the rug respectively.

The principal objects of the present invention are: to provide apparatus and method for cleaning and restoring a rug which removes substantially all foreign material embedded within a nap or pile side thereof; to provide such rug cleaning apparatus and method for use in performing high speed operations of vibrating, spraying high pressure jets of cleansing and rinsing fluids onto the nap or pile side, and heat drying and air cooling the rug; to provide such rug cleaning apparatus and method for removing substantially all foreign material, such as dirt, dust, lint, sand, and other impurities without injury to the nap or pile and for restoring the appearance of the nap or pile; to provide such rug cleaning apparatus and method wherein foreign material removed by initial vibrating is collected in a collection chamber and removed therefrom by vacuum means; to provide such rug cleaning apparatus and method which is particularly adapted for mass production methods of cleaning rugs of various sizes; and to provide such rug cleaning apparatus which is economical in use, easily maintained, positive in operation, and particularly well adapted for the proposed use.

Other objects and advantages of this invention will become apparent from the following description taken in connection with the accompanying drawings wherein are set forth by way of illustration and example certain embodiments of this invention.

FIG. 1A is a longitudinal sectional view of a portion of rug cleaning apparatus embodying features of the present invention.

FIG. 1B is a longitudinal sectional view of the remaining portion of the rug cleaning apparatus.

FIG. 2 is an end elevational veiw of a rug vibrating device with portions broken away to illustrate the component parts.

FIG. 4 is a transverse sectional view through the washing section of the rug cleaning apparatus taken on line 4—4, FIG. 1A.

FIG. 5 is a fragmentary perspective view of drive means for moving a rug through the washing section.

Figure 3:
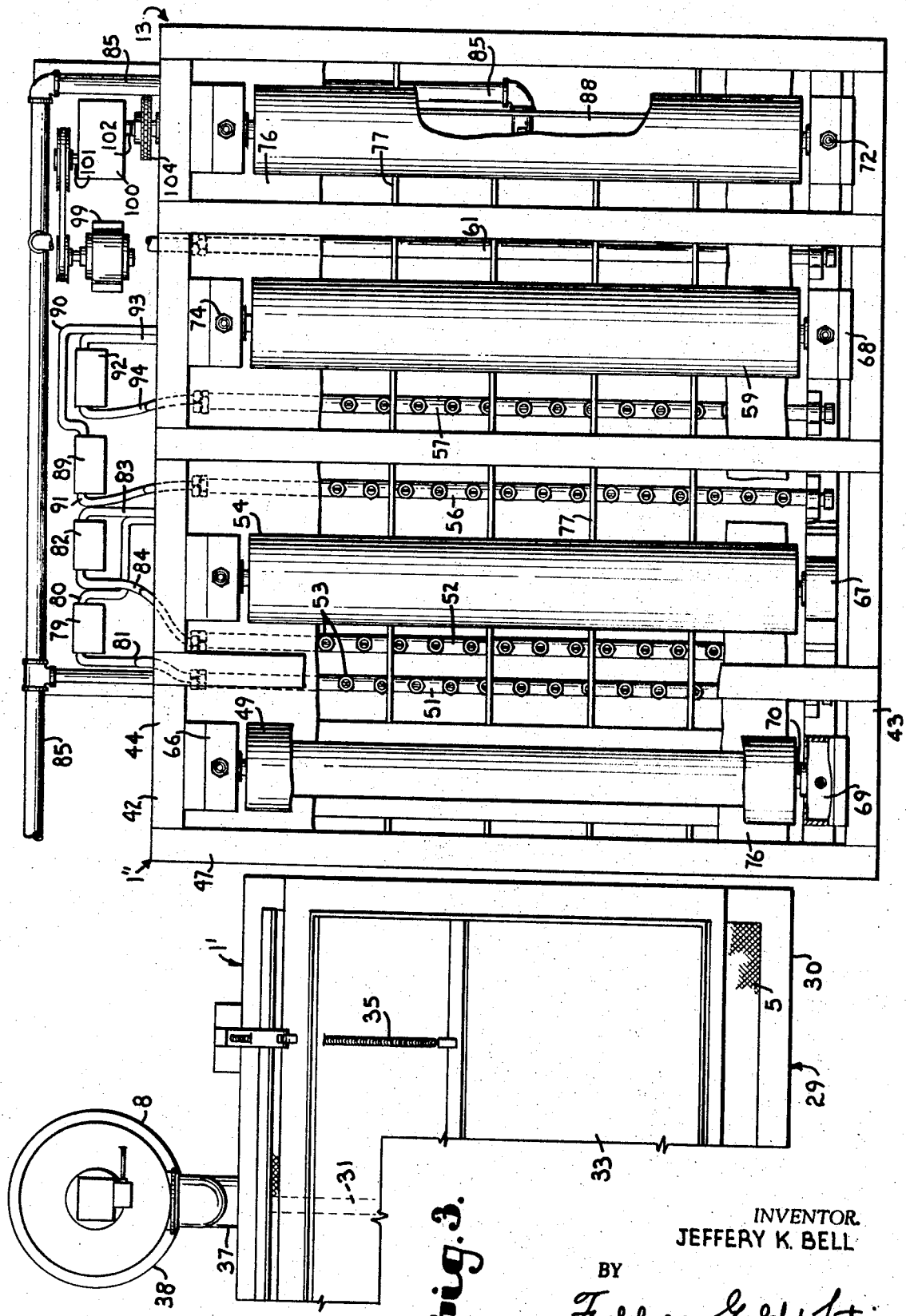
FIG. 3 is a partial plan view of the vibrating device and a rug washing section of the rug cleaning apparatus wtih portions broken away to illustrate the component parts.

Referring more in detail to the drawings:

The reference numeral 1 generally designates rug cleaning apparatus for cleaning and restoring a rug 2 having a nap or pile side 3 and a backing portion 4. The rug 2 is placed on a vibrating device 1′ having a horizontal screen 5 with the nap or pile side 3 engaging the screen 5 and vibrating means 6 associated with the screen 5 operative for vibrating the rug 2 thereby removing a substantial portion of foreign material embedded in the nap or pile side 3 and collecting same in a collection chamber 7 below the screen 5 where vacuum means 8 removes the collected foreign material.

The rug 2 is moved from the vibrating device 1′ and placed in a washing section 1″ supported on an elongated frame 9 which has a receiving end 10 positioned adjacent the screen 5 of the vibrating device 1′. The washing section 1″ has spraying or washing means 11 positioned to spray cleansing fluid and then rinsing fluid against the nap or pile side 3 and rinsing fluid against the backing portion 4 while rug moving means 12 move the rug 2 between the receiving end 10 and a discharge end 13 of the frame 9. The rug 2 is moved along a defined path 14 with the nap or pile side 3 positioned to be sprayed by the spraying or washing means 11 and a rotary brushing roller 15, positioned adjacent the discharge end 13, then restores the appearance of the nap or pile of the rug 2.

Rug turning means 16 are positioned adjacent the discharge end 13 of the frame 9 to receive the rug 2 therefrom and turn same to place the backing portion 4 thereof in engagement with belt conveying means 17. A plurality of heating elements 18 are positioned adjacent the belt conveying means 17 to dry the nap or pile while the rug 2 is moved therealong. Fan means 19 are positioned adjacent an end of the belt conveying means 17 opposite the end receiving the rug 2 with the fan means 19 cooling the heated and dried rug.

The horizontal screen 5, vibrating means 6, and collection chamber 7 are carried on the vibrating device 1′ of the rug cleaning apparatus 1. The vibrating device 1′ has a support structure 20 having a base portion 21 with a plurality of pads 22 depending therefrom for engaging a suitable foundation or floor surface 23. A plurality of corner uprights or posts 24 are suitably secured to, as by welding, and extend upwardly from the base portion 21 and support side or edge members 25 which are suitably secured to the upper ends of the posts 24 to define a lower frame portion 26. A plurality of shafts 27 are suitably secured to, as by welding, and extend upwardly from the side or edge members 25 to receive suitable resilient members, such as rubber or neoprene bars 28. An upper frame portion 29 is resiliently supported on the upper ends of the bars 28 as by a plurality of shafts 27′ depending from the frame 29 and being received in the respective resilient bars 28. The upper frame portion 29 is formed of a plurality of side or edge members 30 and at least one intermediate member 31.

The horizontal screen 5 is suitably secured to the upper frame portion 29, as by being welded to an upper surface of the side or edge members 30 and to an upper surface of the intermediate member 31. The upper frame portion 29 and the screen 5 thereon are vibrated by a motor 32 mounted on the upper frame portion 29, preferably centered on the intermediate member 31. The motor 32 is preferably of the eccentric type or may rotate a driven shaft having an eccentric on the free end of the driven shaft.

A cover member 33 has one edge hingedly mounted on one of the side or edge members 25 of the lower frame portion 26 and a suitable handle or gripping bar 34 is positioned at an opposite edge of the cover member 33. An operator grasps the handle 34 and moves the cover member 33 to a closed position covering and spaced above the screen 5 and the rug 2 placed thereon. Suitable resilient members, such as springs 35, are positioned to bias or move the cover member 33 to an open position thereby permitting the rug 2 to be placed on the screen 5, nap or pile side 3 down. The cover member 33 confines the rug 2 between the vibrating screen 5 and the cover member 33 and closes the upper portion of the collection chamber 7 whereby the area around the rug cleaning apparatus 1 is substantially free of the foreign material removed from the rug 2.

The collection chamber 7 is a hopper type structure having an open upper end suitably secured, as by welding, to an upper surface of the lower frame portion 26 and the hopper structure has an aperture 36 in a bottom portion thereof. A suction conduit 37 extends from a vacuum device 38 to the aperture 36 for withdrawing foreign material, such as lint, dirt, sand, and the like, from the collection chamber 7.

The spraying or washing section 1″ of the rug cleaning apparatus 1 is carried on the elongated frame 9 which has a base portion 39 having a plurality of pads 40 depending therefrom for supporting the spraying or washing section 1″ on the foundation or floor surface 23. A plurality of uprights or posts 41 extend upwardly from each side of the base portion 39 to provide support for elongated side or edge frames 42 and 43 each having elongated upper and lower rails 44 and 45 respectively connected together by a plurality of longitudinally spaced posts 46. Upper and lower end rails 47 and 48 respectively extend transversely between the upper and lower rails 44 and 45 of the side or edge frames 42 and 43 at each of the opposite ends 10 and 13 thereof to complete the frame-work portion of the elongated frame 9 carrying the spraying or washing section 1″ of the rug cleaning apparatus 1.

The rug 2 is removed from the vibrating screen 5 after a predetermined duration of vibration and placed in the receiving end 10 of the elongated frame 9 where a pair of vertically spaced upper and lower rollers 49 and 50 respectively grippingly engage the rug 2 and move same to a position above a pair of longitudinally spaced elongated spray bars 51 and 52 extending transversely of the upper frame-work portion of the elongated frame 9 and each having a plurality of spray nozzles 53 longitudinally spaced along each of the spray bars 51 and 52 for directing overlapping high pressure sprays of cleansing fluid, as later described, against or onto the nap or pile side 3 of the rug 2.

A pair of vertically spaced upper and lower rollers 54 and 55 respectively grippingly engage the rug 2 and move same to a position above a pair of longitudinally spaced elongated spray bars 56 and 57 each being substantially parallel with the spray bars 51 and 52 and having a plurality of the spray nozzles 58 longitudinally spaced along the spray bars 56 and 57 for directing overlapping high pressure sprays of rinsing fluid, as later described, against or onto the nap or pile side 3 of the rug 2 to rinse the cleansing fluid therefrom and additional foreign material from the nap or pile side 3 of the rug 2. It is preferable to closely space the spray bars 56 and 57 and to closely space the spray nozzles 58 thereon and to offset the nozzles on one of the spray bars between the nozzles on the other spray bar to provide a complete overlapping coverage of the nap or pile side 3 by the rinsing fluids.

A pair of vertically spaced upper and lower rollers 59 and 60 respectively grippingly engage the rug 2 and move same to a position below an elongated spray bar 61 substantially parallel with the spray bars 51, 52, 56, and 57 and having a plurality of the spray nozzles 62 longitudinally spaced along the spray bar 61 for directing overlapping high pressure sprays of rinsing fluid, as later described, against or onto the backing portion 4 of the rug 2.

The useful life of rugs is substantially reduced by embedded foreign material within the nap or pile, therefore, it is desirable to remove substantially all the foreign material therefrom. To accomplish this the axis of the spray nozzles 58 on the rinsing spray bars 56 and 57 are directed toward the receiving end 10 to thereby form an acute angle with the nap or pile side 3. The intersection of the axis of the spray nozzles 58 on the final rinsing spray bars 56 and 57 with the nap or pile side 3 is at a point between the respective spray bar 56 or 57 and the receiving end 10 of the frame 9 whereby the sprays or jets of final rinsing fluid are directed opposite the direction of movement of the rug 2 to remove the cleansing fluid and additional foreign material which has been deeply embedded in the nap or pile of the rug 2.

It is also preferable that the spraying direction of the nozzles 62 on the rinsing spray bar 61 be opposite the direction of movement of the backing portion 4 of the rug 2 thereby flushing any foreign material from the backing portion 4 of the rug 2 while rinsing the adjacent rollers 59 and 60 to remove any lint or nap or pile thereon.

A pair of vertically spaced upper and lower rollers 63 and 64 respectively grippingly engage the rug 2 and move same through the discharge end 13 of the frame 9 and onto the rug turning means 16, as later described.

Each of the lower rollers 50, 55, 60 and 64 have an elongated shaft 65 with the opposite ends thereof rotatably mounted in respective lower roller mounting brackets 66 and 67 which are mounted on the side or edge frames 42 and 43 respectively to support said lower rollers 50, 55, 60 and 64 which are longitudinally spaced along the frame 9 and vertically aligned with the upper rollers 49, 54, 59 and 63 respectively. Each lower roller is rotatably mounted in a fixed position vertically and each upper roller is adjustable vertically to vary the spacing between the respective lower roller to conform to the thickness of the rug 2 being moved therebetween and to wring moisture therefrom. It is preferable that the rollers 63 and 64 adjacent the exit or discharge end 13 be closely spaced to compress the rug 2 to remove substantially all of the free fluid within the nap or pile thereof prior to drying same.

In the illustrated structure, a plurality of housings 68 are mounted on the upper rail 44 of each of the side or edge frames 42 and 43 and each housing 68 forms a guide or way for a block 69 having an end of a roller shaft 70 rotatably mounted therein. Each housing 68 has an upper or top member 71 having an elongated adjustment shaft 72 rotatably mounted therein and extending therethrough and having a lower end mounted in the block 69. A suitable resilient member, such as a spiral compression spring 73 is sleeved on the adjustment shaft 72 and has opposite or upper and lower ends engaging the block 69 and the upper or top member 71 of the housing 68 respectively. Each adjustment shaft 72 has a portion thereof threaded to be received in a suitable threaded member, such as a nut 74, which is fixedly mounted on an upper surface of the upper or top member 71 of each housing 68. An upper end of each adjustment shaft 69 is shaped to receive a suitable handle 75 whereby when the handle 75 is turned the respective adjustment shaft 72 will be raised or lowered thereby raising or lowering one end of the respective upper roller relative to the fixed lower roller.

The defined path 14 extends between the receiving end 10 and the exit or discharge end 13 of the elongated frame 9 to guide the rug 2 between each pair of the vertically spaced upper and lower rug moving rollers. The vertical space between each pair of the rug moving rollers is substantially aligned with the defined path 14. An upper portion of the defined path 14 is illustrated as a plurality of longitudinally spaced upper planar members 76 extending transversely of the elongated frame 9. In the illustrated structure, the upper planar members 76 positioned between the upper rollers 49 and 54 and between the upper rollers 54 and 59 are solid members to contain the sprays of cleansing fluid and rinsing fluid respectively within the washing section 1″ and the planar member 76 between the upper rollers 59 and 63 is foraminous to permit the rinsing spray from the spray bar 61 to engage the backing portion 4.

The upper planar members 76 each are substantially aligned tangentially with a lower edge of the respective upper rollers. The upper planar members 76 are elongated members havng opposite ends fixedly supported on the side or edge frames 42 and 43 respectively to limit the upward movement of the rug 2 under pressure of the jets of fluid from the respective spray nozzles 53 and 58 and substantially enclose the upper portion of the elongated frame 9 to confine the sprays of cleansing and rinsing fluid within the elongated frame 9.

A lower portion or limit of the defined path 14 is illustrated as a plurality of longitudinally spaced elongated lower foraminous members 77 extending transversely of the elongated frame 9 and each foraminous member 77 has a plurality of transversely spaced elongate bars, extending longitudinally of the elongated frame 9. The foraminous members 77 are below the respective upper planar member 76 and are tangentially aligned with an upper edge of the respective lower rollers 50, 55, 60 and 64. A foraminous member 77 is also positioned adjacent the receiving end 10 and adjacent the exit or discharge end 13 of the frame 9 to guide the rug 2 through the washing section 1″. Opposite ends of each foraminous lower planar member 77 are fixedly supported on the side or edge frames 42 and 43 respectively to support the rug 2 during movement through the washing section 1″.

A source of a suitable cleansing fluid, such as a mixture of detergent or soap and water, is operatively connected to the first spray bars 51 and 52 for spraying same against the pile or nap side 3 of the rug 2. The spray nozzles 53 are sized to provide a high pressure spray to enter the nap or pile and to dislodge additional foreign material not removed by the vibrating means 6.

In the illustrated structure, a tank or reservoir 78 is mounted on the elongated frame 9 adjacent the receiving end 10. A pump 79 has a pump inlet flow line 80 communicating with the cleansing fluid reservoir 78 and a pump outlet flow line 81 communicating with the spray bar 51. A pump 82 has a pump inlet line 83 communicating with the cleansing fluid reservoir 78 and a pump outlet line 84 communicating with the spray bar 52.

It is desirable to prevent the cleansing fluid reservoir 78 from running dry, therefore, a supply conduit 85 is connected to a source of suitable fluid, such as city water and communicates with the reservoir 78 to supply water thereto in the event the level therein becomes below a selected safety level. A float valve 86 is operated by a float 87 and is responsive to the fluid level in the reservoir 78 to maintain same above the safety level.

The spray bars 56 and 57 are each operatively connected to a source of suitable rinsing fluid, such as clear water, and the nozzles 58 thereon are spaced to provide overlapping sprays of high pressure rinsing fluid against the nap or pile side 3 of the rug 2. The sprays each have sufficient pressure to raise a respective portion of the rug 2 above the bars of the foraminous member 77 thereby providing access to the entire surface of the nap or pile side 3 of the respective rug 2.

In the illustrated structure, a tank or reservoir 88 is mounted on the elongated frame 9 between the cleansing fluid reservoir 78 and the discharge end 13. A pump 89 has a pump inlet flow line 90 communicating with the rinsing fluid reservoir 88 and a pump outlet flow line 91 communicating with the spray bar 56. A pump 92 has a pump inlet flow line 93 communicating with the rinsing fluid reservoir 88 and a pump outlet flow line 94 communicating with the spray bar 57.

It is also necessary to prevent the rinsing fluid reservoir 88 from running dry, therefore, the supply conduit 85 communicates with the reservoir 88 to supply water thereto. A float valve 95 is operated by a float 96 and is responsive to the rinsing level in the tank or reservoir 88 to maintain same above a selected safety level.

In the illustrated structure, the spray bar 61 is connected directly to the supply conduit 85 whereby suitable clean rinsing water, such as city water, is directed onto the backing portion 4 of the rug 2.

The reservoirs 78 and 88 are illustrated as open top structures carried on the frame 9 and positioned below the spray bars 51, 52, 56, 57, and 61, therefore, it is desirable to substantially prevent cleansing fluid and foreign material removed from the rug 2 from entering same, therefore, fluid collecting means in the form of an elongated plate 97 is carried on the frame and positioned below the defined path 14 and spray bars to collect said rinsing and cleansing fluid and deliver same to a suitable sewer or discharge line 98.

The rug moving means 12 engages the respective rug 2 at the receiving end 10 and moves same through the washing section 1″. In the illustrated structure, the lower rollers of each of the pair of vertically spaced rollers are operatively connected to a suitable drive motor 99 for rotating same to move the rug 2 from the receiving end 10 to the discharge or exit end 13 of the frame 9. The drive motor 99 rotates a drive shaft extending therefrom which is operatively connected to a gear reduction unit 100 having a rotatable shaft 101 mounted therein. The shaft 101 is operatively connected to an output shaft 102. The output shaft 102 is operatively connected to one end of the shaft 65 supporting the lower roller 64, adjacent the discharge or exit end 13 of the frame 9, by a suitable power transmitting member, such as an endless chain 104. The other end of the shaft 65 supporting the lower roller 64 adjacent the exit end 13 of the frame 9 is operatively connected to one end of the shaft 65 supporting the lower roller 60 by a suitable power transmitting member, such as an endless chain 105, for rotating same. The other end of the shaft 65 supporting the lower roller 60 is operatively connected to one end of the shaft 65 supporting the lower roller 55 by a suitable power transmitting member, such as an endless chain 106, for rotating same. The other end of the shaft 65 supporting the lower roller 55 is operatively connected to one end of the shaft 65 supporting the lower roller 50 by a suitable power transmitting member, such as an endless chain 107, for rotating same to move the rug 2 through the frame 9.

The brushing roller 15 is positioned adjacent the discharge end 13 of the washing section 1″ and is rotatably driven by a suitable motor 108 which is operatively connected to a suitable gear reduction unit 109 operatively connected to the brushing roller 15 for rotating same. It is preferable that the brushing roller 15 engage the nap or pile side 3 of the rug 2 to raise the nap or pile thereon and that the brushing roller 15 be rotated by the drive motor 108 at a speed faster than the travel of the respective rug 2.

The rug turning means 16 receives the respective rug 2 after the brushing roller 15 has raised the nap or pile and moves same until the rug 2 engages a suitable trip switch 110 which activates a suitable motor 111. The rug turning means 16 is illustrated as including a conveyor 112 to move the rug to the trip switch 110 whereby the motor 111 moves arms 113 through one hundred eighty degrees (180°) to place the backing portion 4 against the conveyor 112 and expose nap or pile to the heating elements 18. In the illustrated structure, the brushing roller 15, rug turning means 16, and the conveyor 112 are carried on an elongated frame 114 similar to the frame 9.

The belt conveying means 17, in the form of a conveyor 115, are supported on an elongated structure 116 having one end 117 thereof adjacent the conveyor 112 for receiving the rug 2 therefrom. A belt is mounted on the conveyor 115 in a manner to travel in an endless path around the one end 117 and an other end 118 to move the rug 2 adjacent the heating elements 18. The conveyor structure 115 is illustrated as a framework substantially similar to the frames 9 and 114. The conveyor 115 is driven along the endless path by suitable drive means, such as a motor and gear reduction unit (not shown) which are operatively connected with one of a pair of rollers, 119 and 120 at the opposite ends thereof.

The belt conveyor 115 moves the rug 2 through a heater housing 121 surrounding the conveyor 115 intermediate the ends thereof. The heater housing 121 has a plurality of the heating elements 18 positioned adjacent the conveyor 18 and directed toward the nap or pile side 3 of the rug 2 being moved along the conveyor 110. It is preferred that the heating elements 18 be of a type to provide sufficient heat to dry the pile or nap, such as infrared heating cones.

The rug 2 having the heated and thereby dried pile is then moved into a fan housing 122 where a conveyor 123 receives and moves same adjacent the fan means 19 for cooling thereof prior to other handling operations, such as rolling and wrapping for shipment.

It is to be understood that, while I have illustrated and described one form of my invention, it is not to be limited to the specific form or arrangement of parts herein described and shown.

What I claim and desired to secure by Letters Patent is:

1. Rug cleaning apparatus comprising:
   (a) a screen positioned to support a rug having a nap side engaging said screen;
   (b) vibrating means associated with said screen for vibrating same and said rug thereon;
   (c) an elongate frame having a rug receiving end positioned adjacent said screen and having rug moving means carried thereon;
   (d) path defining means carried on said frame for guiding said rug between opposite ends of said frame;
   (e) drive means carried on said frame for driving said rug moving means thereby moving said rug along said defined path; and
   (f) a plurality of elongate spray bars longitudinally spaced along said frame, each of said spray bars extending transversely of said frame and having a plurality of spray nozzles spaced therealong, each of said spray nozzles being directed toward said nap side of said rug for flow of washing fluid thereagainst.

2. The rug cleaning apparatus as set forth in claim 1 including:
   (a) a collection chamber positioned below said screen for receiving foreign material for said rug; and
   (b) vacuum means communicating with said collection chamber for removing said foreign material therefrom.

3. The rug cleaning apparatus as set forth in claim 2 wherein:
   (a) said nozzles on each of said bars are spaced to provide overlapping sprays at said nap side of said rug; and
   (b) at least one of said spray bars has an axis of the spray nozzles thereon forming an acute angle with said nap side of said rug for removing additional foreign material therefrom.

4. The rug cleaning apparatus as set forth in claim 1 wherein said washing fluid is a cleansing fluid and a rinsing fluid, said rug cleaning apparatus including:
   (a) a source of cleansing material operatively connected to at least one of said spray bars; and
   (b) fluid collecting means carried on said frame and positioned below said spray bars.

5. The rug cleaning apparatus as set forth in claim 4 including:
   (a) a reservoir carried on said frame and positioned to receive rinsing fluid, said reservoir being below said fluid collecting means; and
   (b) pump means operatively connected to said reservoir and to said spray bars for moving said rinsing fluid from said reservoir to said spray bars under pressure.

6. The rug cleaning apparatus as set forth in claim 4 including:
   (a) belt conveying means positioned to receive said rug from said defined path and move same therealong; and
   (b) heating elements adjacent to said belt conveying means for drying said rug during movement along said belt conveying means.

7. The rug cleaning apparatus as set forth in claim 6 including:
   (a) at least one rotary brushing roller positioned adjacent a discharge end of said frame for engaging the nap side of said rug, said brushing roller being rotated faster than the travel of said rug; and
   (b) rug turning means positioned adjacent said belt conveying means for receiving said rug and turning same to place a backing portion thereof in engagement with said belt conveying means.

8. The rug cleaning apparatus as set forth in claim 1 wherein said rug moving means includes:
   (a) a plurality of rollers arranged in longitudinally aligned and spaced pairs;
   (b) said rollers in said pairs being vertically spaced apart; and
   (c) said spacing between said rollers of said pairs being substantially aligned with said path defining means.

9. The rug cleaning apparatus as set forth in claim 8 wherein said path defining means includes:
   (a) a plurality of planar members extending transversely of said frame and longitudinally spaced therealong, said planar members each being substantially aligned tangentially with a lower edge of each upper roller of said pairs of rollers; and
   (b) a plurality of foraminous members each having a plurality of transversely spaced elongate bars extending longitudinally of said frame, each foraminous member being below said respective planar member and substantially tangentially aligned with an upper edge of each lower roller of said pairs of rollers.

10. A method of cleaning a rug comprising:
    (a) supporting a rug in a flat position on a screen with the nap side thereof extending downwardly and engaging said screen;
    (b) mechanically vibrating said screen and the rug thereon while in said flat position thereby removing foreign material from said nap side;
    (c) moving said rug along a defined path with said nap side extending downwardly;
    (d) spraying a plurality of overlapping jets of cleansing fluid upwardly against said nap side of said rug during said moving; and
    (e) spraying a plurality of overlapping jets of rinsing fluid upwardly against said nap side of said rug during said moving.

11. The method of cleaning a rug set forth in claim 10 including:
    (a) arranging said jets of rinsing fluid in a plurality of lines extending transversely to said defined path; and (b) directing an axis of each of said jets along at least one of said lines at an acute angle with said nap side of said rug, said axis of each of said jets intersecting said nap side at a point beyond said respective line of jets in the direction of movement of said rug along said defined path.

12. The method of cleaning a rug as set forth in claim 10 including:
   (a) collecting foreign material removed from said rug during said vibrating thereof; and
   (b) removing said collected foreign material by vacuum means.

13. The method of cleaning a rug as set forth in claim 10 including:

(a) brushing said nap side of said rug; and
(b) heating said rug thereby drying said nap side thereof.

References Cited
UNITED STATES PATENTS

| | | | |
|---|---|---|---|
| 1,196,527 | 8/1916 | Dehon | 68—13 |
| 1,714,273 | 5/1929 | Mabrey | 68—13 |
| 1,287,651 | 12/1918 | Dehon | 68—13 |
| 2,729,536 | 1/1956 | Pull et al. | 68—13X |

WILLIAM I. PRICE, Primary Examiner

U.S. Cl. X.R.

8—137; 15—308; 68—13, 19